United States Patent [19]

Le Clerc De Bussy

[11] Patent Number: 4,860,808

[45] Date of Patent: Aug. 29, 1989

[54] PROCESS AND DEVICE FOR HARVESTING COPSES GROWN IN LINES

[76] Inventor: Jacques Le Clerc De Bussy, 80290 Poix De Picardie, Bussy, France

[21] Appl. No.: 242,896

[22] Filed: Sep. 12, 1988

[30] Foreign Application Priority Data

Sep. 14, 1987 [FR] France .............. 87 12674
Jan. 4, 1988 [FR] France .............. 88 00012

[51] Int. Cl.$^4$ ............................................ A01G 23/08
[52] U.S. Cl. .................................. 144/335; 144/3 D; 144/34 R; 144/34 B; 144/336; 241/101.7
[58] Field of Search ............... 144/3 D, 34 R, 34 B, 144/335, 336; 241/101.7

[56] References Cited

U.S. PATENT DOCUMENTS

| | | | |
|---|---|---|---|
| 3,979,075 | 9/1976 | Heron | 241/101.7 |
| 4,232,719 | 11/1980 | Payton | 144/34 R |
| 4,236,554 | 12/1980 | Nicholson | 144/34 R |
| 4,338,985 | 7/1982 | Smith et al. | 144/34 R |
| 4,355,670 | 10/1982 | Ohberg et al. | 144/34 R |
| 4,690,224 | 9/1987 | Shwez | 241/101.7 |

FOREIGN PATENT DOCUMENTS 2293870 7/1976 France .
2414297 8/1979 France .

Primary Examiner—W. Donald Bray
Attorney, Agent, or Firm—Watson, Cole, Grindle & Watson

[57] ABSTRACT

A machine for harvesting and cutting into sections ligneous stems which grow upwardly from cultivated copses includes a frame which mounts an inverted trough for bending the upper portions of the stems to almost an almost horizontal orientation as the frame moves forwardly; a saw for cutting the bent stems near their bases; a counter blade which provides a plurality of guide funnels that are generally vertically oriented and which have upper outlet orifices with sharp edges; a curved guide element along which the cut stems can move and gather into bundles for movement to and through respective guide funnels of the counter blade; a rotating drum for moving the cut stems along the guide element; and a drum with peripheral blades which pass over the outlet orifices of the guide funnels in the counter blade to cut the bundles of stems passing through the outlet orifices into sections.

14 Claims, 3 Drawing Sheets

PROCESS AND DEVICE FOR HARVESTING COPSES GROWN IN LINES

BACKGROUND OF THE INVENTION

The invention is directed to the annual harvesting of cultivated copses, preferably in lines, and is related to the invention described in my U.S. Pat. No. 4,787,917, which discloses a method for the production, harvesting and torrefaction of wood originating from copses grown in lines and harvested manually.

The intensive growing of copses from stumps planted in lines provides strong ligneous stems with small lateral branches, which stems are annually able to reach 300 to 400 cm in height and a diameter of 3 or 4 cm at the base.

Harvesting takes place after the leaves have fallen, and it provides 30 to 40 tons of so-called "green" wood per hectare.

In order to achieve the aims proposed in my U.S. Pat. No. 4,787,917 and other similar aims, it is imperative, at the time of harvesting, to reduce the entire ligneous production into cylindrical sections of approximately 2 to 4 cm in length. In fact, this produces a semi-fluid material with a high apparent density and a natural slope of approximately 40°, and the mass thereby formed has a uniform permeability to gasses which will have to pass through it at greater or lesser speed during the processing and use operations my above-noted patent.

So-called "ensilage blower" harveter-chopper machines are in existence. These very powerful machines are currently used for harvesting fodder corn; however, they cannot be used for harvesting copses because none has a gathering system adapted to harvesting highly ligneous stems. Moreover, none of these machines is capable of processing the year-old copse substantially only into cylindrical sections. In fact, the product of harvesting contains, in addition to sections of this shape, more or less long pieces of brushwood originating from the cutting of the lateral branches located on the ligneous stems and a high proportion of crushed wood originating from the badly adapted chopping machine part. The material obtained therefore does not possess the required characteristics.

The published French Patent Applications No. 2,414,297 (T. W. Nicholson) and 2,293,870 (Kyosti Pollari) and the Patent U.S. 4,338,985 (F. M. Smith et al.) also disclose machines for removing the trunks and branches of ligneous plants and for transforming them into chips. None of these machines has been designed to provide cylindrical sections of substantially uniform length.

SUMMARY OF THE INVENTION

The invention aims to provide a process and a machine for correctly carrying out gathering of ligneous stems and presenting them in a suitable manner to a chopping apparatus with which this machine is equipped so that virtually all the ligneous material produced is cut up into sections of uniform length of the order of 2 cm to 4 cm.

In order to obtain this result, the invention provides a process for harvesting in successive rows and simultaneously chopping ligneous stems which are virtually vertical, possibly having branches, and originating from cultivated copses, comprising the following steps:

bending stems in a first direction to bring their upper part close to the horizontal, and maintaining their upper part approximately in this position;

cutting the base of the stems near the ground and allowing the lower part of the stems to move upwards by means of elasticity;

moving the cut stems, base first, in a second direction opposite to the first, and gathering them into a continuous bundle of parallel stems;

making the bundle pass through a guide orifice with a sharp-edged outlet;

moving over the outlet of this guide orifice at least one cutting blade for cutting the stems into successive sections;

removing the cut sections.

Preferably, the cut stems are bent and made to follow a curved upward path in order to penetrate into the guide orifice.

The invention also provides a machine for harvesting in successive rows and simultaneously chopping ligneous stems which are virtually vertical, possibly having branches, and originating from copses cultivated in lines, comprising:

a frame which is movable in a direction of advance with respect to the ground;

a tunnel, carried by the frame, in the form of an inverted trough, in a smooth material, and which is horizontal or slightly inclined, oriented according to the direction of advance, this tunnel being placed at a suitable height for bending the stems without breaking them when the machine advances in the first direction, and bringing their upper part up against the lower face of the tunnel;

means for cutting the base of the stems near the ground;

a fixed piece, which is carried by the frame and which is perforted with at least one guide orifice, through which at least one stem may pass, and which has a sharp-edged inlet and outlet;

a chopping apparatus equipped with at least one cutting blade which is moved over the outlet of the guide orifice;

guide and drive means capable of gathering the stems which have been cut at their base and which have approached the horizontal as a result of elasticity, and of driving them into the guide orifice or orifices;

means for removing the sections formed from the steam by the chopping machine.

The process according to the invention twice uses the property of elasticity possessed by the ligneous stems; once for gathering when the previously bent stems are maintained in this position by forcing them to pass under a tunnel at the horizontal and longitudinal top of which the tops of the stems are squeezed against each other before the butt ends are cut near the ground, which has the result, by releasing the elastic energy accumulated at the time of cutting, of causing them to be raised into alignment with the tops of the stems in order to allow mechanical take-up in the horizontal plane; and a second time in order to gather the cut stems into a parallel bundle, and more especially when they are caused to follow a curved path by forcing them to follow the curvature of a curved surface, for the formation of a bundle of stems intended for correctly feeding the chopping apparatus.

BRIEF DESCRIPTION OF THE DRAWINGS

The invention will now be explained in more detail with practical examples, illustrated by the drawings. Wherein.

In all the figures, the same reference numbers denote similar elements.

DETAILED DESCRIPTION OF THE PREFERRED EMBODIMENTS OF THE INVENTION

Figure 1:
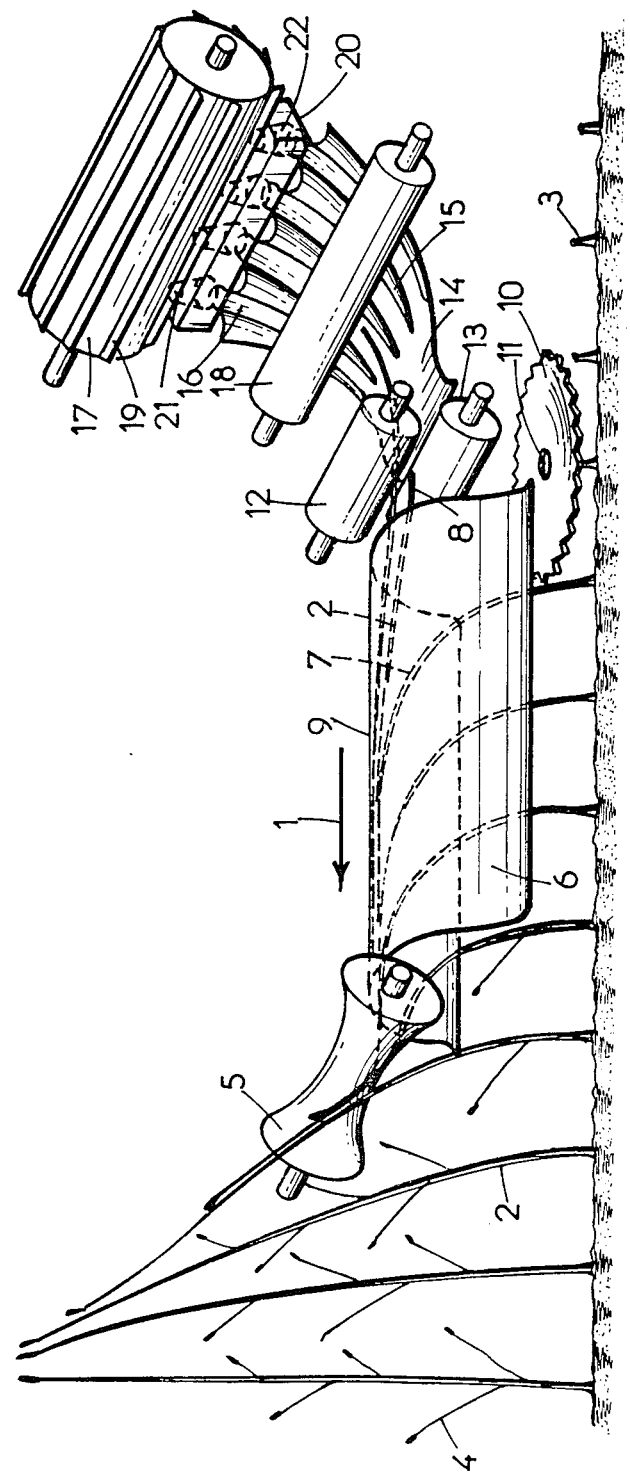
FIG. 1 is a diagrammatic view in perspective of a first embodiment of the invention.

In FIG. 1, only the components essential for understanding the invention have been represented in position. In particular, in this figure, there is no representation of either the frame which supports the various components of the machine nor of the tractor which it is intended should carry the frame. Only the direction of advance of the machine has been indicated by the arrow 1. The device straddles the line of subjects to be harvested. Only one stem 2 per stump 3 has been represented whilst in reality they carry up to 5 to 10 thereof.

Each stem has some branches 4 of smaller cross-section and which are situated laterally.

A front diabolo 5, with an axis which is horizontal and perpendicular to the direction of advance, and which freely rotates, bends the stems as the harvesting machine advances.

The device of FIG. 1 comprises, fixed axially under the carrying machine and straddling the line being harvested, a tunnel 6 produced in a smooth material, of at least 100 cm in length, 70 cm high above the ground and approximately 50 cm wide, which tunnel is open towards the bottom, inside and at the top 9 of which the bent stems 7 come to slide and to be pressed whilst, when they are cut near the ground, their bases 8 stand upright and are substantially in the extension of their stems which are then pressed horizontally against the arch of the tunnel, after which two drive rollers 12 and 13, providing the mechanical take-up of the stems, are arranged transversely.

Cutting near to the ground is performed using a circular saw 10 placed according to a slightly inclined plane in ordr to avoid its fixing nut on the axis 11 striking against the stumps 3. The stems, whose butt ends 8 will spring upwardly, are then seized using a set of transverse drive rollers 12 and 13 whose circumferential speed is slightly greater than the speed of advance of the harvesting machine, this device having the result that any blockages are prevented.

The device of FIG. 1 comprises a guide element 14 has an upper surface which curves upwardly and ends perpendicularly to the direction of advance of the machine, which guide element may be produced from stamped sheet metal and has ribs 14 whose profiles increase laterally and vertically, finally defining separate and diverging troughs 16, at the bottom of which the strands are applied and guided towards the chopping machine. A rotating roller 18, provided in a median part above the guide element 14, has the purpose of maintaining the curved stems against the guide element and thereby bringing them, despite their elasticity, right to the bottom of the troughs 16. The stem forming the bundle have diameters varying from some 3 cm for the butt ends to approximately 0.5 cm for the heads.

The bundles which have a substantially constant cross section are formed from stems being cut at different stages, and which are in fact integrated successively into the bundles as the machine advances.

A chopping apparatus 17 with a blade-bearing drum 19 is finally defined in that the counter blade of the chopping apparatus is formed from a piece of steel 20 perforated with orifices 21 downstream of guide funnels 22 whose axis is substantially vertical, orifices through which the bundles emerging from the channels 16 are forced, with slight friction, in such a manner that the branches 4 are forced into alignment in the extesion of the stems which bear them, just before cutting takes place. The diameter of the orifices 21 of the counter blade 20 is of the order of two to three times the maximum diameter of the stems to be harvested.

The density of the stems on one and the same line to be harvested, combined with the number and the diameter of orifices of the counter blade are such that the bundles which pass through them just before cutting occupy no more than half the cross section of the orifices and that no more than two stem butt ends can never be presented therein at the same time.

The relative speeds of advance of the rods towards the chopping apparatus and of presentation of the blades in front of the orifices of the counter blade are adjusted in such a manner that the sections cut by the machine are approximately 2 to 4 cm in length; at the outlet of the chopping apparatus the sections may be taken up again using handling apparatuses which are well known and not shown in FIG. 1. Mention may be made of herring-bone belts or bucket elevators. However, it is preferable to use handling means linked with the arrangement of FIG. 2 which will now be described.

Figure 2:
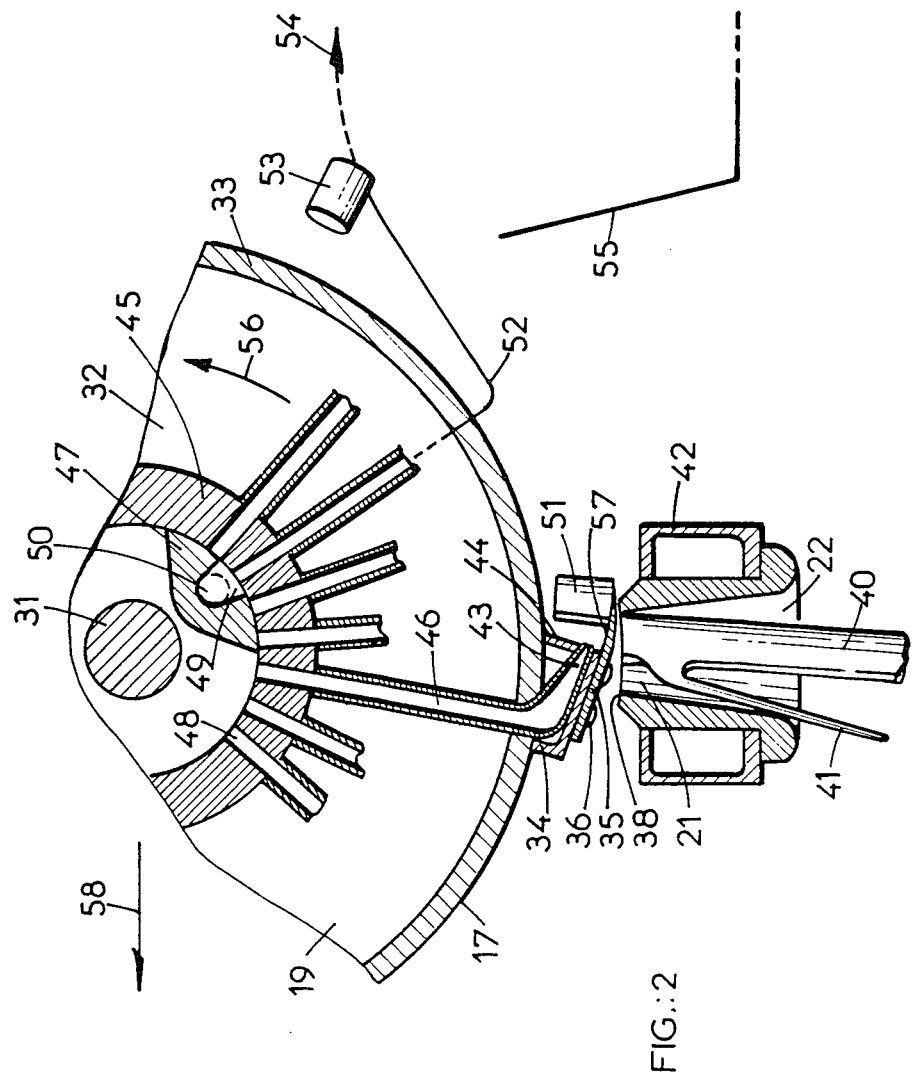
FIG. 2 is a simplified partial section of one part of the chopping machine.

FIG. 2 relates to a detail of the chopping machine.

The design of rotating chopping apparatus is well knon, however, it has been noted that an adaptation to the problem in question was advantageous in order to obtain clean cutting hich is approximately perpendicular to the axis of each ligneous stem. The cutting blades must have a tapered profile and their edge must be on a cylindrical surface very close to the outlet of the guide orifices. It is also necessary for the blades to be at a small angle with the tangent to thiss cylindrical surface. It is then noted that good results are obtained with respect to the shape of the product, but that the centrifugal force applied to the sections which are maintained by it against the inner face of the cutting blades makes their subsequent removal difficult, and that they may do a complete circuit and come to disturb the cutting of the following sections. In order to avoid this drawback and to separate the sections from the cutting blades at the appropriate point, use is preferably made of the arrangement described below with reference to FIG. 2.

The chopping apparatus 17 used comprises a drum 19 mounted on horizontal axis of rotation 31 carrying two side plates 32 at the periphery of which a blade-bearing roller 33 is welded and on which are fixed by welding blade carriers 34 equipped with their blades 35 fixed by the bolts 36.

These blades carriers may, for example, be six in number per circular row and the drum is equipped with four rows, they are offset by one twenty-fourth of a turn corresponding to twenty-four blades fitted on the drum, generating twenty-four cutting forces which are equally distributed during one rotation of the chopping machine.

The blades 35 pass over the blade carrier which is, in fact, formed from four orifices 21 placed in a row parallel to the axis of the drum and located under the latter. Their lips 38 are sharpened in order to permit clean cutting of the stems.

In order to ease interpretation of the drawing, only one equipped blade carrier and one single counterblade orifice has been represented.

The orifices 21 are preceded by guide funnels 22 through which the stem 40 must necessarily pass in order to be cut. This arrangement makes it possible for the lateral branches 41 fixed to the stems to be aligned just before cutting. The orifices 21 and their funnels 22 are integrally fitted onto a beam 42 having a rectangular cross section, and which is itself integral with the frame of the machine and which isnot represented in this figure.

Flattened nozzles 43 are incorporated in the blade carrier 34. They traverse their front face 44 and are directed in order to blow air along the inner face 57 of the blade 35, perpendicularly to its cutting. The jet of air which they produce, flattened in the cutting direction of the blade, has a width is approximately equal to the diameter of the orifice 21 of the counter blade, so as to provide complete removal of the sections.

These nozzles are connected to a rotating compressed air distributor 45 by mean of a conduit 46. The air distributor 45 is integral with the plate 32 of the drum, whilst a shoe 47 providing the compressed air is fixed integrally with respect to the frame of the machine.

In this way, the rotation of the drum and therefore of the distributor cause the orifices 48 of the distributor 45 to pass in front of the slot 49 of the shoe 47, and they are then succesively supplied with a sweeping current of compressed air supplied by the inlet orifice 50 of the distributor by means of piping, which is not shown, connecting it to a compressor.

It will be noticed that, by virtue of this arrangement, the injection of air by the nozzles 43 and consequently the sweeping of the blades always takes place in the same angular position and that, by this means, the sections 51 are swept at 52 and propelled at 53 along a parabolic path 54 in order to fall directly into a receiving tub 55.

In the figure, the arrow 56 indicates the direction of rotation of the drum whilst the arrow 58 shows the direction of advance of the machine.

Figure 3:
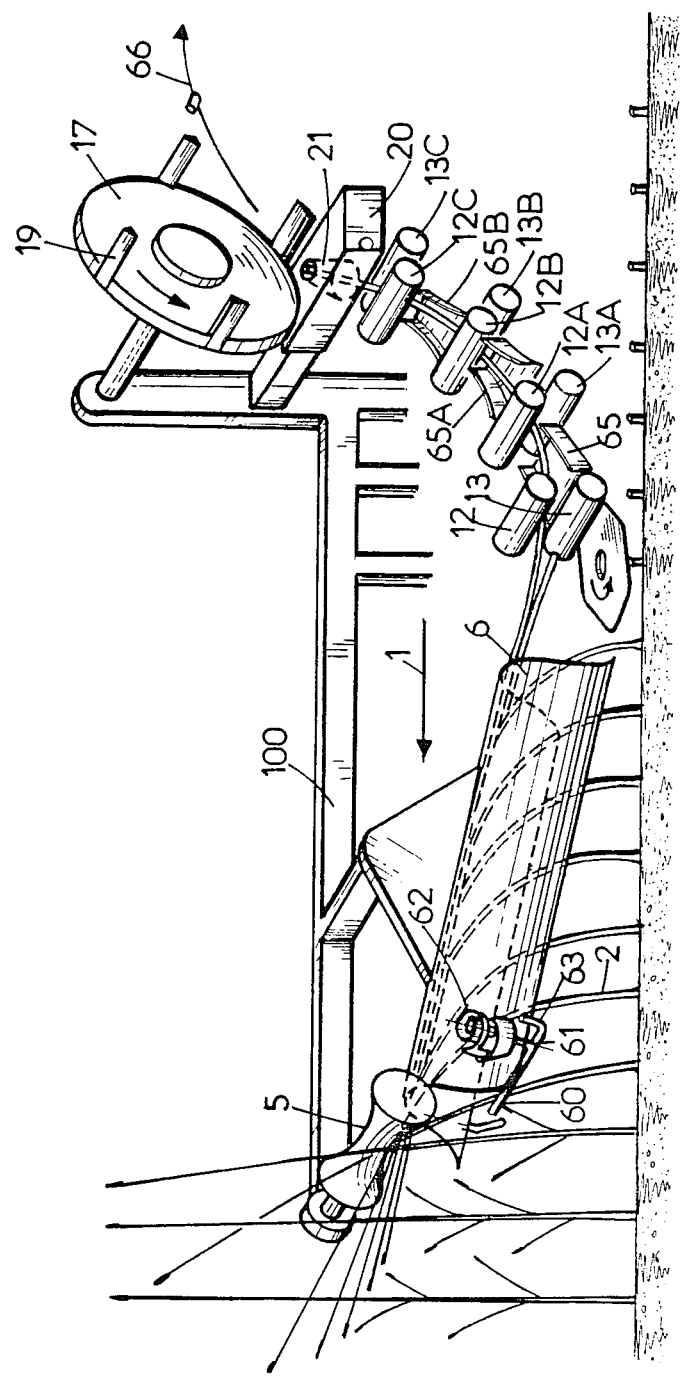
FIG. 3 is a diagrammatic view in perspective of a preferred embodiment of the invention.

FIG. 3 is a view similar to that of FIG. 1, showing a certain number of variants which make the machine represented that which is most preferred, at least for use in temperate climates. The different variants may be combined together, as in the figure, or used in combination with the arrangements described with respect to FIG. 1.

A first variant relates to the tunnel 6. Instead of being horizontal, this is inclined downwards and rearwards with respect to the direction of travel indicated by the arrow 1. The slope of the tunnel is approximately 15°. Slopes of 10° to 30° may be suitable. This produces a more progressive bending of the stems and a better alignment for the formation of the bundle.

Moreover, the tunnel is provided on its lateral edges with horizontal fingers 60, only two of which are shown, fitted on vertical pivots 61 located on the lateral edges of the tunnel. Each finger is provided with a return spring 62 which tends to make it pivot forwards, and a stop 63 prevents the finger passing a forward position which is substantially perpendicular to the direction of advance. The arrangement of the spring 62 and of the stop 63 in the figure is symbolic, and different return and stopping means may be used.

The purpose of the fingers is as follows: in normal progress inside a field, the stems 2 which are not cut keep the stems located further back in the direction of advance against the lower face of the tunnel until they are cut at the base and taken up by the drive rollers 12, 13. The fingers 60 are then pushed back by the same stems and are inactive. On arriving at the edge of a field, the absence of stems enables the fingers to assume the position which is perpendicular to the advance. They then support the last stems of the edge zone and enable them to be completely processed.

Another variant relates to the means for cutting the stems at the base. FIG. 1 shows a circular saw 10 provided with teeth. It has been noted that cleaner cutting surfaces were obtained with processed stems which are aged at most a year by using a saw made from a piece which is substantially in the form of a hexagon, with cutting edges. It has been noted that the edges remain cutting for a very long time, by virtue of the fact that the stems are relatively soft, and that the cutting surface is plane and regular.

Provision may be made for the edges to be cutting over their entire length, which makes it possible to prolong use of the piece by turning it, or alternatively only the part of the edge which is turned towards the front in the direction of rotation is cutting.

A piece in the form of a hexagon has been described, but a piece having the form of another convex polygon, for example a pentagon or a square, could be suitable. The choice depends particularly on the nature of the stems to be cut.

Other variants relate to the counter blade 20 which contains the guide orifice 21 and the means for guiding the bundle of stems towards the orifice 21. Unlike FIG. 1, there is only one single orifice 21, so that the bundle is not to be divided. In order to obtain the result that the stems which are in the orifice do not occuy more than half or one-third of the cross section of the orifice, it is necessary to quadruple the speed of movement of the stems with respect to the case of FIG. 1. This speed is preferably at least four times greater than the speed of advance of the machine. Clearly, this ratio depends particularly on the density of the vegetation.

In order to obtain these high speeds, the guide means comprises a series of pairs of drive rollers 12, 13; 12A, 13A; 12B, 13B; 12C, 13C, between which deflecting troughs 65, 65A, 65B are located, which troughs have a decreasing cross section and are curved upwards, intended to squeeze against themselve the bundle of stems driven by the drive rollers and to curve it upwards in order to cause it to penetrate into the funnel 22 upstream of the guide orifice 21, with an axis directed upwards.

The blade-carrier drum 17 is constructed on the same principle as that of FIG. 1, but it clearly has a smaller axial length since there is only one orifice 21. Its speed of rotation must, of course, be adapted to the speed of movement of the stems in order to obtain sections of the desired length, i.e. 2 to 4 cm approximately. It is therefore higher than in the case of FIG. 1. The intense centrifugal force increases the usefulness of the blowing devices represented in FIG. 2, and which are not shown again in FIG. 3 for reasons of clarity. The arrow 66 indicates the path of the sections pushed by the jet of compressed air towards a container intended to receive them.

In the case of FIG. 1, as in that of FIG. 3, provision has been made for the stems to follow a path which is curved upward in order to end up at the guide orifice 21, and for the latter to have an orientation which is closer to the vertical than the horizontal and, preferably, it is vertical. This arrangement makes it possible to arrange the blade-carrier drum 17 above the counter-blade piece 20, and therefore at a satisfactory distance from the ground. Moreover, the cut sections are driven by the blades first horizontally then upwards. This facilitates their removal either by the blowing of air, as described in FIG. 2, or by another, for example mechanical, means.

A diagrammatic representation has been given at 100 of a part of the frame of the machine. This frame carries the spindles of diabolo 5, rollers 12, 13, 12A, 13A, etc. and of the blade-carrier drum 17, as well as the tunnel 6 and the deflecting troughs 65, 65A, 65B. The frame 100 may be equipped with means for attaching it to a tractor and/or wheels.

A similar frame, which is not represented, is used in the machine of FIG. 1.

I claim:

1. Process for harvesting in successive rows and simultaneously chopping ligneous stem which are virtually vertical and which originate from cultivated copses in the ground, comprising the steps of:
   bending the stems in a first direction to bring upper parts thereof close to horizontal and maintaining their upper parts approximately in this position;
   cutting the stems near the ground such that lower parts of the stems will move upwardly by means of elasticity;
   moving the cut stems, lower parts first, in a second direction opposite to the first, whilst gathering them into a continuous bundle of parallel stems;
   moving the bundle into and through a guide funnel having a sharp-edged outlet orifice;
   moving over the outlet orifice of this guide channel at least one cutting blade for cutting the stems into successive sections; and
   moving the cut sections away from the outlet orifice.

2. The process as claimed in claim 1, in which the cut stems are bent and made to follow a curved upward path in order to move into the guide funnel.

3. A machine for harvesting and chopping into a plurality of sections ligneous stems which extend generally vertically from rows of cultivated copses in the ground, said stems having upper portions and base portions near the ground, said machine comprising
   a frame which is movable in a forward direction with respect to the ground and the rows of cultivated copses,
   an inverted trough means mounted on said frame so as to contact said upper portions of said stems and bend said stems without breaking as said frame moves in said forward direction,
   cutting means for cutting said bent stems at said base portions thereof,
   a chopping apparatus which includes
   means forming aa guide funnel having an outlet orifice with a sharp-edged lip and through which at least one cut stem can pass, and
   chopping means which is movable over said outlet orifice to cut each stem passing therethrough into a plurality of sections,
   a guide element which extends towards said outlet orifice,
   drive means for moving said cut stems over said guide element and into said guide funnel, and
   means for moving said plurality of cut sections away from said outlet orifice.

4. The machine as claimed in claim 3, wherein said inverted trough means is mounted on said frame so as to be horizontally oriented.

5. The machine as claimed in claim 3, wherein said inverted trough means has a leading end and a trailing end and said trough means is mounted on said frame to be downwardly inclined from its leading end to its trailing end by between about 10° to 30°.

6. The machine as claimed in claim 5, wherein said inverted trough means has lateral edges and includes horizontal fingers at said latera edges which are capable of pivoting about vertical axes between a first position where they are perpendicular to said forward direction, and a second position where they are oriented in the opposite direction to said forward direction, said fingers being provided with return means which tend to force them towards the first position and the force of which is overcome by the resistance of the stems when the machine moves in said first direction.

7. The machine as claimed in claim 5, wherein said cutting means comprises a rotatable disc which is approximately horizontally oriented and in the form of a convex polygon.

8. The machine as claimed in claim 5, wherein said chopping means consists of an element mounted to rotate about a horizontal axis perpendicular to said forward direction and which carries at least one cutting blade whose edge is parallel to said axis.

9. The machine as claimed in claim 5, wherein the drive means comprise pairs of drive rollers.

10. The machine as claimed in claim 9, wherein the pairs of drive rollers are provided with means for causing them to rotate at a peripheral speed several times greater than the speed of advance of the machine over the ground.

11. The machine as claimed in claim 5, wherein said drive means are arranged in order to define a path which is curved upwards, and the guide orifice has a direction closer to the vertical than to the horizontal.

12. The machine as claimed in claim 5, wherein the guide funnel comprises an inlet part which is turned towards said drive means and which converges towards the outlet orifice.

13. The machine as claimed in claim 8, wherein the removal means comprise at least one blowing nozzle capable of sending a jet of air over a section cut by a cutting blade and held on the inner face of the latter by centrifugal force.

14. The machine as claimed in claim 13, wherein the blowing nozzle is connected to a source of compressed gas by means of a rotating distributor rotating at the same speed as the chopping machine, this distributor supplying the nozzle in such a manner that the section thrown by blowing is sent towards a receiving means.

* * * * *